United States Patent
Wu (10) Patent No.: US 7,103,362 B2
(45) Date of Patent: Sep. 5, 2006

(54) SYSTEM AND METHOD FOR RADIO TRANSMITTER ACQUISITION

(75) Inventor: Shiquan Wu, Ottawa (CA)

(73) Assignee: SOMA Networks Inc.

( * ) Notice: Subject to any disclaimer, the term of this patent is extended or adjusted under 35 U.S.C. 154(b) by 317 days.

(21) Appl. No.: 10/473,337

(22) PCT Filed: Mar. 27, 2002

(86) PCT No.: PCT/CA02/00433

§ 371 (c)(1),
(2), (4) Date: Apr. 7, 2004

(87) PCT Pub. No.: WO02/080404

PCT Pub. Date: Oct. 10, 2002

(65) Prior Publication Data

US 2004/0156464 A1  Aug. 12, 2004

(30) Foreign Application Priority Data

Mar. 29, 2001 (CA) .................................. 2342529

(51) Int. Cl.
*H04Q 7/20* (2006.01)

(52) U.S. Cl. .................. 455/450; 455/451; 455/452.1; 455/452.2; 370/508; 370/509; 370/510; 370/512; 370/513; 370/514

(58) Field of Classification Search ................ 455/450, 455/451, 452.1, 452.2; 370/376, 458, 470, 370/459, 508, 509, 510, 512, 513, 514
See application file for complete search history.

(56) References Cited

FOREIGN PATENT DOCUMENTS

| EP | 1 028 552 A | 8/2000 |
|---|---|---|
| EP | 1028552 A1 * | 8/2000 |
| WO | WO 00 49723 | 8/2000 |

OTHER PUBLICATIONS

Dahlman E., et al., UMTS/IMT-2000 Based on Wideband CDMA, IEEE Communications Magazine, V. 36, No. 9 Sep. 1, 1998, pp. 70-80.

Nystrom J., et al., Comparison of Cell Search Methods for Asynchronous wideband CDMA Cellular System, International Conference on Universl Personal Communications, IEEE, New York, NY, V 2, Oct. 5, 1998, pp. 783-787.

* cited by examiner

*Primary Examiner*—Edan Orgad
*Assistant Examiner*—Dominic E. Rego
(74) *Attorney, Agent, or Firm*—Katten Muchin Rosenman LLP (57) ABSTRACT

A method of a receiver determining the timing of a signal transmitted in a time-slotted manner, the signal comprising a sequence of information which is repeated at a known interval and has at least a known minimum length. The method performs correlation operations between groups of received slots of information, the groups spaced by the known interval. The groups are moved through the received signal, adding and removing slots, to locate a maximum correlation value sum for the group which should correspond to the timing of the slot. The method also can be used to determine a frequency offset at the receiver and/or an initial phase.

5 Claims, 3 Drawing Sheets

SYSTEM AND METHOD FOR RADIO TRANSMITTER ACQUISITION

FIELD OF THE INVENTION

The present invention relates to system and method for a receiver to acquire a transmitter of a radio signal. More specifically, the present invention relates to a system and method for a radio receiver to acquire and interpret a multiplexed radio signal from a transmitter which employs a slotted, or other time-based, transmission structure.

BACKGROUND OF THE INVENTION

Advanced radio communications systems are being developed and deployed to provide wireless voice and data services. One example of such an advanced radio communications system presently being developed is that specified by the Third Generation Partnership Project, or 3GPP, which is an international partnership of telecommunications standards organizations. More information about the communications systems being specified by the 3GPP, including technical specifications, can be found on their web page www.3gpp.org, or from the various member organizations.

The proposed 3GPP system is a communications system which employs cellular-type networks to permit communications between fixed base station transceivers and customer transceivers which can be mobile or fixed. One of tasks such an advanced communications system must perform is the acquisition of a base station transmitter by the receiver in a customer device transceiver when the customer device is powered on and at various other times, for example to support handoff of the customer device between base stations. Acquisition of the base station transmitter by the customer device receiver includes many of the steps required for communication to commence between the base station and the customer device, including determining synchronization/timing, carrier offset and the initial phase of signals received by the customer device from the base station.

Due to the complexity of the structure and arrangement of the physical communication channels, multipath effects, etc., acquisition can be difficult and/or computationally expensive to achieve. As will be apparent to those of skill in the art, this difficulty and/or complexity can increase the cost of customer devices and/or can result in poor service, for example if acquisition requires too long a time to achieve.

SUMMARY OF THE INVENTION

It is an object of the present invention to provide a novel method and system for a radio receiver to acquire a radio transmitter in a communication system, the method and/or system obviating or mitigating at least some of the above-identified disadvantages of the prior art.

According to a first aspect of the present invention, there is provided a method for a radio receiver to acquire timing information for a radio transmitter which transmits, in a time-slotted arrangement, at least one signal which includes a sequence of information indicating the slot timing and having a length at least equal to a known minimum length and which sequence is repeated in said at least one signal at a known interval, the method comprising the steps of:

(i) receiving a number of slots of said at least one signal which is at least sufficient to allow reception of two repetitions of said known minimum length of said sequence;

(ii) forming a first group of said received slots at least equal in number to said known minimum length and a counterpart group of the same number of received slots but spaced from said first group by said known interval, each group having a first slot and a last slot;

(iii) for each slot in said first group and its corresponding slot in the counterpart group, performing a correlation operation to obtain a correlation value for information in each of these corresponding pairs of slots;

(iv) summing said obtained correlation values to obtain a correlation sum and storing said obtained correlation sum;

(v) obtaining a next correlation sum by:

(a) performing a correlation operation to obtain a correlation value for information in the slot at the first slot of said first group and the corresponding slot in said counterpart group;

(b) performing a correlation operation to obtain a correlation value for information in the slot outside the first group adjacent to the last slot of said group and the corresponding slot outside said last slot of said counterpart group;

(c) reforming said first group and said counterpart group to exclude the respective slots first slots and to include the respective slots adjacent the last slots; and (d) from the correlation sum last obtained, subtracting the correlation value obtained in (a) and adding the correlation value obtained in (b) to obtain a correlation sum;

(vi) storing said correlation sum obtained in (d);

(vii) repeating steps (v) and (vi) until a number of correlation sums equal to said known minimum length are obtained and stored;

(viii) examining said stored obtained correlation sums to select the sum with the greatest magnitude, this selected sum indicative of the presence of said sequence and thereby indicating the slot timing.

According to another aspect of the present invention, there is provided a method of determining frequency offset in a radio receiver from a signal transmitted by a radio transmitter which transmits, in a time-slotted arrangement, at least one signal which includes a sequence of information indicating the slot timing and having a length at least equal to a known minimum length and which sequence is repeated in said at least one signal at a known interval, comprising the steps of:

(a) receiving said signal and determining the slot timing of said signal;

(b) forming a vector comprising determined correlation values between an instance of said minimum length of said known information as received by said receiver and said known information signal;

(c) repeating step (b) for additional received instances of said minimum length of said known information to obtain a set of vectors;

(d) forming an inner product of said set of vectors to obtain a set of obtained products;

(e) determining an average value of said obtained products and determining the arctangent of the average value;

(f) determining from the nominal frequency of interest and a predetermined maximum error in the receiver the values, if any, which can be added to the determined arctangent;

(g) from $$\Delta f = \frac{B}{2\pi (\text{interval})T},$$

where B=tan$^{-1}$ (average value)+2π (the values determined in step (f)) and interval is the number of slots between the start of instances of the signal, determining the possible frequency offsets Δf for each value determined in step (f) and testing each determined value by applying it to said minimum length of said known information as received by said receiver and then correlating the resulting information with said known information signal; and (h) selecting the possible frequency offset with the best correlation value determined in step (g) as the frequency offset.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

The 3GPP system, discussed above, includes a primary synchronization channel (PSCH) and a secondary synchronization channel (SSCH) which are broadcast from each base station and which are used by each customer device to acquire the base station. In the 3GPP system, all channels (including these two synchronization channels) are broadcast in the form of slotted frames, with most channels having frames of ten milliseconds (10 ms) duration and wherein each frame includes fifteen slots.

Presently, the 3GPP system is generally contemplated as being based upon CDMA multiplexing techniques and the following discussion relates to a CDMA related embodiment of the present invention. However, as will be apparent to those of skill in the art, the present invention can be applied to other multiplexing techniques including OFDM, FDMA, TDMA and combinations of such techniques such as GSM.

As discussed in the 3GPP documentation, the PSCH is used by customer devices to determine the timing of the slots within frames transmitted by a base station. A predefined data sequence, the primary synchronization sequence, is transmitted in the slots and frames of the PSCH and this sequence has been defined and arranged such that customer devices can determine the start time of the slots in the frames transmitted from the base station by determining the location of this sequence in a received set of chips (in a CDMA implementation).

Once the slot timing has been determined by a customer device from the PSCH, the SSCH is examined by the customer device to determine the timing of the frames, i.e. the start time of each frame, and other information, including scrambling codes used by the base station, etc. The acquisition and processing of the PSCH and SSCH channels is performed at the start up of a customer device as it first acquires a base station and, in mobile systems at least, is performed on an ongoing basis for adjacent cells to permit handoffs between cells as the customer device moves between service areas.

Figure 1:
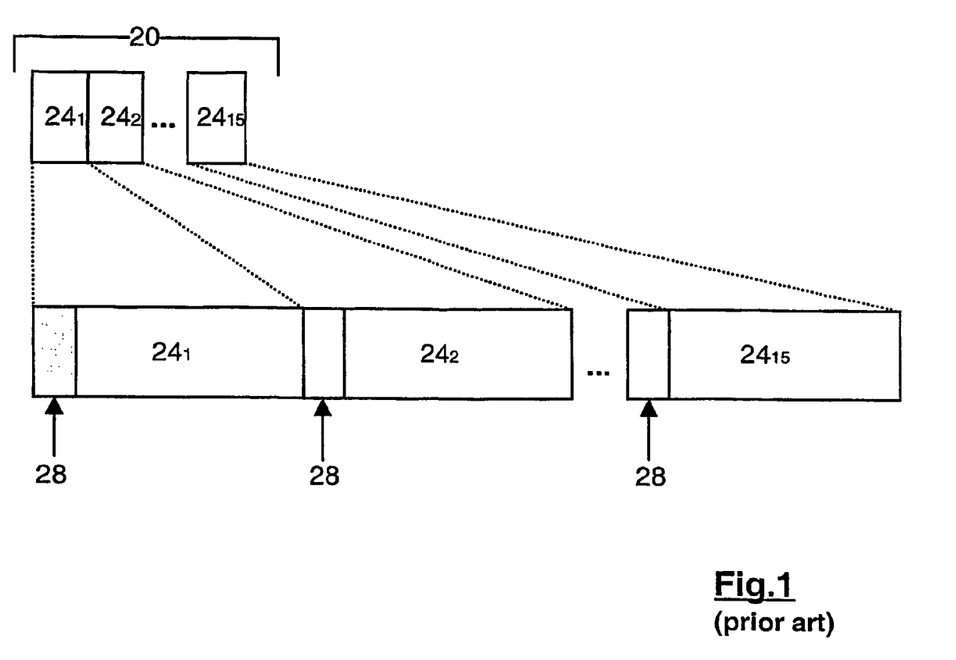
FIG. 1 shows the radio channel frame and slot structure proposed by the 3GPP organization and the arrangement of a synchronization signal therein.

FIG. 1 shows a PSCH frame, from the 3GPP system. As shown, a frame 20 includes fifteen slots $24_1$ through $24_{25}$. Each slot $24_i$ includes two-thousand, five-hundred and sixty (2,560) chips so that frame 20 has a total of thirty-eight thousand, four hundred (38,400) chips. The broadcast duration of frame 20 is ten milliseconds, for a chip rate of three million, eight-hundred and forty thousand (3.84 million) chips per second.

As indicated, the primary synchronization sequence 28 is broadcast in the first two hundred and fifty six chips of each slot $24_i$. As part of the acquisition of the signals transmitted by a base station, the customer device performs a correlation between the received signal and the known two-hundred and fifty-six predefined chips of primary synchronization data to determine the slot timing.

Figure 2:
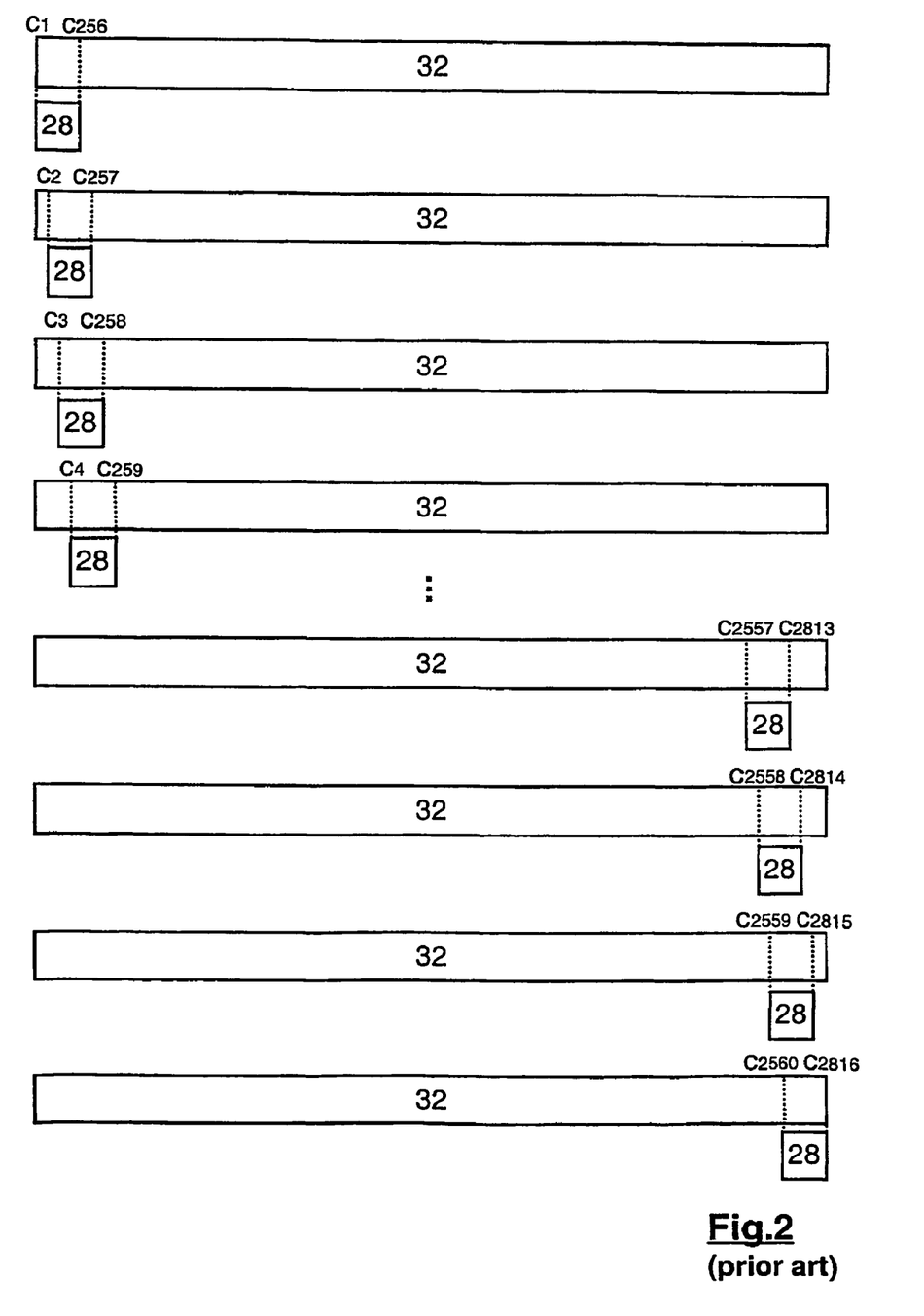
FIG. 2 shows a graphical representation of a correlation operation in a conventional acquisition method.

Conventionally, as shown in FIG. 2, this correlation is performed at every chip $c_i$ in a block of received data 32 and requires chip $c_i$ and the two-hundred and fifty-five following received chips (chips $c_{i+1}$ to $c_{i+255}$) to be correlated with the two-hundred and fifty-six known values for the primary synchronization sequence 28 and the results summed and compared to those obtained when starting at each other chip $c_i$. In fact, to ensure identification of the primary synchronization sequence 28 with a high degree of confidence, the correlation operation is typically performed starting at each of chips $c_1$ to $c_{2560}$, thus requiring the processing of two-thousand eight-hundred and sixteen chips (2,816), which is equivalent to one and a tenth slots of received data.

In FIG. 2, the first correlation operation (shown at the top of the Figure) is performed starting at chip $c_1$ and proceeding through chip $c_{256}$ with the two-hundred and fifty-six values of the primary synchronization sequence 28. The second correlation operation (shown below the first) starts at chip $c_2$ and proceeds through chip $c_{257}$ with the same two-hundred and fifty-six values of the primary synchronization sequence 28. The correlation operation is performed for each subsequent starting chip $c_i$, up to the last operation, shown at the bottom of the Figure, which is performed starting on chip $c_{2560}$ and proceeding through chip $c_{2816}$ with the two-hundred and fifty-six values of the primary synchronization sequence 28.

The highest absolute valued result of these operations, indicating the best correlation, should be found at the location of the first received chip of the primary synchronization sequence 28, thus indicating the start timing of the received slots.

When actually implemented, the received chips are typically at least double-sampled and filtered with a square root raised cosine filter. Thus, the known copy of the primary synchronization sequence is also at least double-sampled and filtered with a square root raised cosine filter before the correlation is performed.

While this conventional technique does work, it requires a large amount of computation to be performed. Specifically, performing the correlation for each one and a tenth slots requires six-hundred and fifty-five thousand, three-hundred and sixty (655,360) complex multiplication operations (256 multiplications of complex numbers for each of 2816 chips), multiplied by the sampling rate, which is typically at least two, and the same number of addition operations. Thus, this technique can be both computationally expensive and time consuming.

The above-mentioned disadvantage of the conventional technique can be further exacerbated if other signals broadcast by the transmitter being acquired are not well behaved. Specifically, in the 3GPP system, all data is transmitted based upon the ten millisecond frame, fifteen slot, structures discussed above. Thus, the customer device is performing the correlation on the total received signal which can include the signals transmitted on other channels. In the 3GPP system, only QPSK (quadrature phase shift keying) modulation is employed for transmitted signals and the power level of signals modulated with QPSK is not excessive with respect to the power levels of the PSCH and SSCH signals. In such circumstances, acquisition can often be achieved after correlating one or a few slots of received data.

However, if other signals are transmitted using QAM (quadrature amplitude modulation) modulation, as proposed by the assignee of the present invention, or other modulation techniques, or the signals are otherwise not well behaved, the power levels of transmitted signals on some channels relative to those of the PSCH and SSCH may be large, requiring correlation to be performed over one or more frames of received signal before sufficient confidence is obtained in the result. Correlating a single frame of received signal with the above-described conventional acquisition technique requires over nine million complex number multiplication operations to be performed, as well as requiring large amounts of memory to store the correlation results for comparison.

The present inventor has determined that slot timing can be obtained in a more computationally, time and memory-efficient manner, relative to the conventional acquisition technique, according to the following system and method.

Unlike the conventional method discussed above, wherein the known primary synchronization sequence is correlated over at least an entire slot of the received signal, the present invention tales advantage of the fact that the primary synchronization sequence repeats after a known, and fixed, number of chips. In the 3GPP system, the primary synchronization sequence is transmitted in the first two-hundred and fifty-six chips of the two-thousand, five-hundred and sixty chips of a slot and the primary synchronization sequence is repeated every slot. Accordingly, the present invention determines the correlation between a received chip and a counterpart chip received two-thousand, five-hundred and sixty chips (i.e.—one slot) before or after. Thus, the correlation value, Cor(k), at a received chip, r(k), is the sum of the two-hundred and fifty-six complex multiplications (multiplications of complex numbers) of each of the received chips r(k) to r(k+256) with received counterpart chips r(k+2560) to r(k+2560+256) or $$Cor(k) = \sum_{i=k}^{k+256} r(i) * r(i+2560).$$

For the first iteration, Cor(k) is solved for k, where k is the first received chip to be examined, and this requires two hundred and fifty six complex multiplication operations and the same number of addition operations to be performed.

Next, Cor(k+z), where z varies over the balance of a complete slot, i.e. $1 \leq z \leq 2559$, must be determined. However, as will be apparent, by correlating the received signal with an offset counterpart received signal, a moving sum method can be employed. Unlike the conventional method wherein two-hundred and fifty-six multiplication and addition operations are required to be performed when the correlation is to be performed for the next received chip, with the moving sum method of the present invention, Cor(k+z) is determined from $$Cor(k+z)=Cor(k+z-1)-(r(k+z-1)*r(k+z-1+2560))+(r(k+256+z)*r(k+256+z+2560))$$

In other words, after any Cor(k+z−1) has been determined (and on the very first iteration z=1 and Cor(k+z−1)=Cor(k)), the next correlation value Cor(k+z) can be obtained by subtracting from the value determined for Cor(k+z−1) the correlation value of the first received chip r(k+z−1) in that last determined value with its offset received chip r(k+z−1+2560) and determining and adding a correlation value for the newly included received chip r(k+z+256) and its offset received chip r(k+2560+z+256).

Thus, the first determined correlation value Cor(k) requires two-hundred and fifty-six complex multiplication and addition operations and each subsequent Cor(k+z) requires two additional complex multiplications [one to calculate r(k+z−1)*r(k+z−1+2560) to be subtracted and one to calculate r(k+z+256)*r(k+1+2560+z+256) to be added], and one addition and one subtraction operation.

Figure 3:
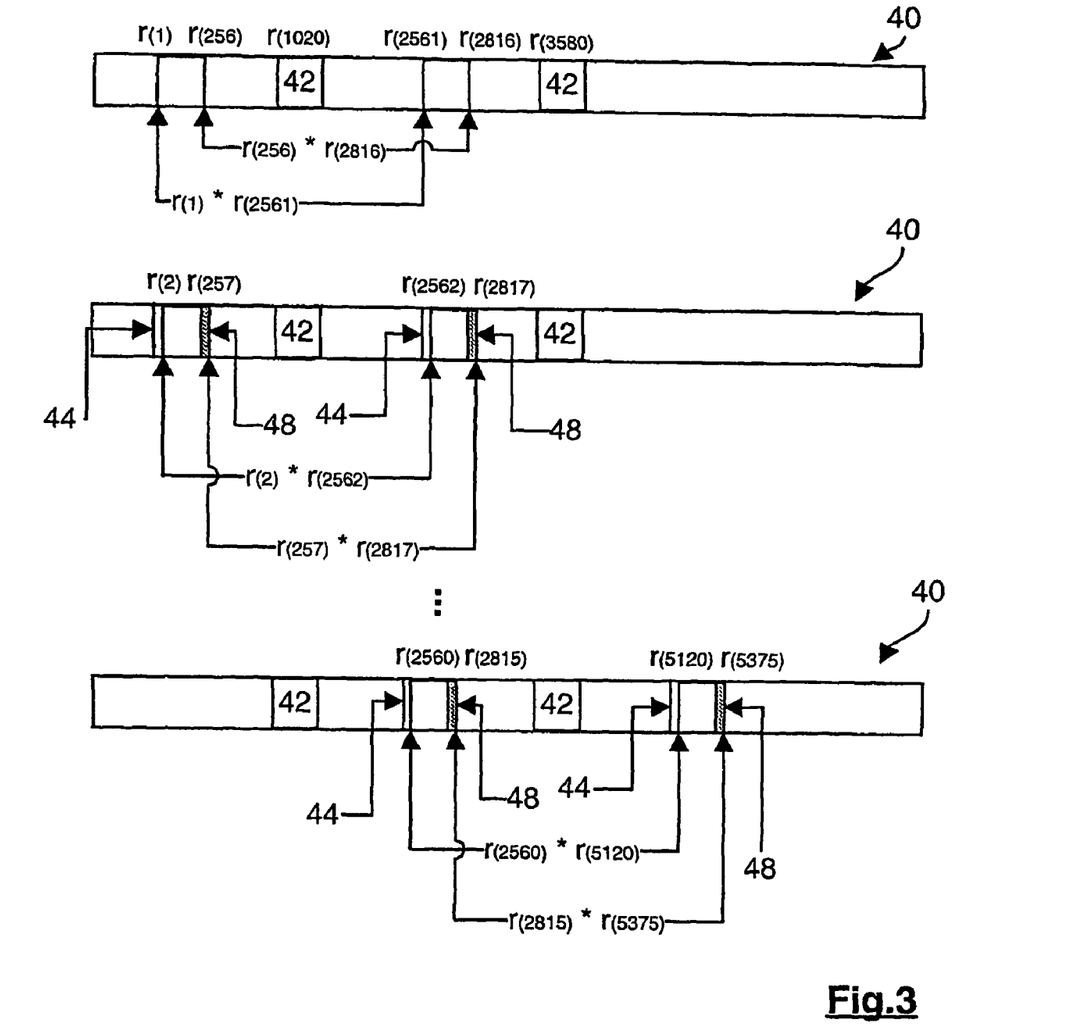
FIG. 3 shows a graphical representation of a correlation operation in accordance with the present invention.

FIG. 3 illustrates this graphically. In the Figure, a number of received chips 40 has been obtained. The repeated sequence 42, has a length of two-hundred and fifty-six chips and is repeated every two-thousand and fifty-six chips.

A first received chip $r_1$, is selected arbitrarily, and all the rest of the received chips $r_i$ are considered relative to this arbitrary starting point. In other words, received chip $r_{256}$ is defined as having been received two-hundred and fifty-five chips after received chip $r_1$ and received chip $r_{2562}$ is defined as having been received two-thousand, five-hundred and sixty-one chips after received chip $r_1$. In the Figure, one instance of repeated sequence 42 is shown commencing at received chip $r_{1020}$ and the next instance is shown commencing at received chip $r_{3580}$.

Figure 4:
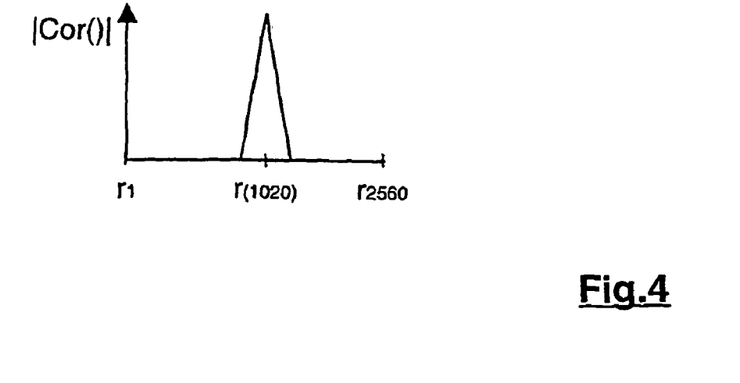
FIG. 4 shows a plot of the absolute value of a correlation value versus the received chip at which the correlation operation was performed.

Received chips $r_1$ through $r_{256}$ are correlated against received chips $r_{2561}$ through $r_{2816}$, respectively, to solve for Cor(1), with $r_1$ being correlated with $r_{2561}$, $r_2$ being correlated with $r_{2562}$, etc. Next Cor(2) is solved for by taking the value determined for Cor(1) and subtracting the contribution 44 of the correlation of $r_1$ and $r_{2561}$, and adding the contribution 48 of the correlation of $r_{257}$ and $r_{2817}$. Typically, the process is repeated for at least the known interval over which the signal is repeated, such as a slot. In the present example, wherein the primary synchronization sequence repeats every two-thousand, five-hundred and sixty chips, at least Cor(1) through Cor(2560) are determined. FIG. 4 shows the result of the absolute value of Cor(1) through Cor(2560). As can been seen, the peak value occurs for Cor(1020) which is a start location of the repeated sequence.

Even if more than one slot length of signal must be processed, for sufficient confidence, the method merely continues subtracting and adding contributions from each previous and successive pair of chips. The present inventors refer to this as a fast scan acquisition method.

Thus, determining correlation values over an entire slot with the fast scan acquisition method requires much less computation that the conventional acquisition method described above, and this difference is even greater if more than one slot must be processed. Further, while the discussion above has been with reference to the presently proposed 3GPP system wherein a predefined synchronization sequence is employed, the fast scan acquisition method can also be employed in systems wherein the synchronization sequence is not predefined (or known) to the customer device. Specifically, as long as the interval at which the synchronization sequence is repeated and the sequence has at least a known minimum length, the fast scan acquisition method can be employed.

Further, the sequence need not comprise a contiguous set of chips (i.e.—some number of adjacent chips) nor is the sequence limited to any particular number of chips (i.e.— two-hundred and fifty-six chips vs. three-hundred chips). The sequence can comprise any periodic sequence of any desired length, as will be apparent to those of skill in the art, where the periodicity of the sequence and a minimum sequence length is known by the receiver. For example, the synchronization sequence can comprise: chips one through seventy-five; chips one-thousand through one-thousand two-hundred; and chips two-thousand through two-thousand and seventy-five of a slot. The length will be selected to provide a desired level of confidence in the result, with longer sequences generally providing greater levels of confidence.

It is contemplated that less than a full sequence can be processed by a particular receiver. For example, the sequence can occupy the entire slot and one receiver may only consider one-tenth of the slot while another, which requires a greater degree of confidence in the result, can process one-half or even all of the sequence.

Many other sequences of suitable lengths and periodicities will be apparent to those of skill in the art and are limited only by the well known design requirements for such sequences, including the need for the sequence to generate an appropriate autocorrelation response and to have a sequence length long enough to provide sufficient confidence in the correlation result.

Depending upon operating conditions experienced by a customer device, and in particular for low received SNR's, the fast scan acquisition method disclosed above may not afford sufficient confidence and/or accuracy in the result. In such a case, the fast scan acquisition method above can be used to determine a best estimate of the location of the start of the slots, $k_{est}$ by identifying the peak absolute Cor( ) value from the set of determined Cor(k)'s, i.e.—from $$k_{est} = \arg\max\ (|Cor(k)|), 1 \leq k \leq 2560$$

(the upper limit of k can exceed 2560 if more than one received slot was processed). Once $k_{est}$ has been determined, conventional-type acquisition methods, as described above with respect to FIG. 2 or any other suitable technique, can be employed over a selected number of received chips preceding and following $k_{est}$ refine the slot timing. For example, the region of interest can be deemed to extend from $k_{est}-40$ to $k_{est}+40$ and the conventional acquisition techniques described above can be used on this interval for refinement.

If additional accuracy is required, perhaps due to very low SNR levels, etc., both the above-described fast scan and/or fast scan and conventional acquisition over a selected region of interest, can be performed independently in the I and Q quadratures. Further, these steps can be performed over several slots, an entire frame or even multiple frames until a desired level of accuracy and/or confidence is obtained.

An additional problem in acquiring a transmitter occurs in determining the frequency offset which is experienced at the receiver due to oscillator error at the receiver. For example, achieving oscillator accuracy of greater than three parts per million (3 ppm) is expensive and many systems, for cost reasons, specify that a 5 ppm oscillator is sufficient. However, the receiver must be able to determine the frequency offset which results from this oscillator error in order to correctly receive signals.

If a transmitter transmits a signal $s_k$, then in a sampled domain the receiver will receive $$r(k) = \hat{s}(k) e^{j\Delta f 2\pi k T} e^{j\phi} + n(k)$$

where $\hat{s}$ is the received version of the transmitted signal (resulting from multi-path effects), $\Delta f$ is the frequency offset, $\phi$ is the initial phase, T is the duration of a chip and n is the noise. In a continuous domain, the received signal is $$r(t) = \hat{s}(t) e^{j2\pi f t} e^{j\phi} n(t)$$

In the present invention, after slot timing has been determined, a vector V is constructed of the first two hundred and fifty six chips of each slot in a received frame which are correlated with the known primary synchronization sequence ($psc_i$) to obtain vectors $$V(1) = \begin{pmatrix} psc_1 * r_1 \\ \vdots \\ psc_{256} * r_{256} \end{pmatrix},$$

$$V(2) = \begin{pmatrix} psc_1 * r_{2560+1} \\ \vdots \\ psc_{256} * r_{2560+256} \end{pmatrix}, \ldots ,$$

$$V(N_{acc}) = \begin{pmatrix} psc_1 * r_{(14*2560)+1} \\ \vdots \\ psc_{256} * r_{(14*2560)+256} \end{pmatrix}$$

As indicated above, it may be desired and/or required to consider more than a frame of slots of received signal to achieve the desired level of confidence and/or accuracy. Thus, $N_{acc}$ slots can be considered, where $N_{acc}$ can be greater than fifteen (or in other slot structures, less than fifteen). The frequency offset information is contained in vectors V(k). One method to extract this information is described below, but other suitable methods will be apparent to those of skill in the art.

To obtain the frequency offset information, the inner product of V can be determined to yield $N_{acc}-1$ data points $$\alpha(m) = V(m)^{*T} V(m+1), m = 1, 2, \ldots, (N_{acc}-1)$$

which are proportional to $e^{j2\pi 2560 \Delta f T}$. Then, defining $$\frac{1}{N_{acc}} \sum_{m=1}^{N_{acc}} \alpha(m) = A$$

and $$2\pi 2560 \Delta f T = \angle(A) = B$$

everything needed to determine $\Delta f$ is known, except $B = 2\pi 2560 \Delta f$ modulo $2\pi$. However, as mentioned before, the oscillator in a receiver is typically specified as having a known maximum error and the range of possible values for B can easily be determined. For example, if the receiver oscillator is specified as having a maximum error of 5 ppm and if the transmission frequency is 1.8 GHz, then B can only have thirteen values, specifically B=∠A+2π×{0, ±1, ±2, ..., ±6}. As will be apparent to those of skill in the art, if the primary synchronization sequence is a different number of chips and/or the number of chips per slot and/or the maximum oscillator error differ in other implementations, the above operations will be modified appropriately.

Therefore, each of these thirteen possible values of B is evaluated by applying the value $B_i$ to the received primary synchronization sequence 28 (in our example the first two-hundred and fifty-six chips in a received slot) and correlating the result to the known primary synchronization sequence 28. The best correlation will occur with the correct value for B. Once B is known, the frequency offset, Δf, can be derived from $$\Delta f = \frac{B}{2\pi 2560 T}$$

as all of the other quantities are now known.

If it is desired to determine the initial phase φ, to initialize a RAKE receiver for example, this can now also easily be determined. The vectors V( ), described above, can also be used for this purpose. If $\kappa = \Sigma e^{jkT\Delta f 2\pi}$, then φ can be determined from $$e^{j\phi} = \sum_{k=1}^{N_{acc}} \frac{sum(V(k))}{N_{acc} * \kappa}$$

As discussed above, the present invention can provide significant advantages over prior art acquisition methods and systems by reducing computational complexity, memory requirements and the time required to acquire a radio transmitter. In addition, the method and system of the present invention can also be employed in other advantageous manners.

As an example of one such additional use of the present invention, if a customer device employs a steerable antenna (either electrically or mechanically steerable) to receive signals from a base station transmitter, the fast scan acquisition method described above can be employed to quickly determine an antenna direction with acceptable reception characteristics. For example, if an electrically steerable antenna with four possible directions is employed, each direction can be selected in turn and the fast scan acquisition method can be performed for that direction and the results of the fast scan from each direction can be used to select an acceptable direction for further communications. In an embodiment of the present invention, the magnitudes of the peak correlation value determined for each direction are compared and the greatest magnitude direction is selected.

Another example of an additional use of the present invention is for a customer device to monitor reception levels of other base stations, or base station sectors (in the case of multi-sector base stations) to permit handoff of the customer device between base stations or sectors. In this context, the customer device can, on an intermittent basis, perform a fast scan for each base station, or base station sector, of interest to obtain an initial indication of the reception levels at the customer device for each transmitter. The customer device can use this information to request hand-off from a present base station or base station sector to another base station or base station sector which it can receive at better levels, or this information can be transmitted to the base station from the customer device, and then on to a network management system which can monitor and/or determine if a handoff should be performed.

Other uses and advantages of the present invention will be apparent to those of skill in the art. The above-described embodiments of the invention are intended to be examples of the present invention and alterations and modifications may be effected thereto, by those of skill in the art, without departing from the scope of the invention which is defined solely by the claims appended hereto.

We claim:

1. A method for a radio receiver to acquire timing information for a radio transmitter which transmits, in a time-slotted arrangement, at least one signal which includes a sequence of information indicating the slot timing and having a length at least equal to a known minimum length and which sequence is repeated in said at least one signal at a known interval, the method comprising the steps of:

(i) receiving a number of slots of said at least one signal which is at least sufficient to allow reception of two repetitions of said known minimum length of said sequence;

(ii) forming a first group of said received slots at least equal in number to said known minimum length and a counterpart group of the same number of received slots but spaced from said first group by said known interval, each group having a first slot and a last slot;

(iii) for each slot in said first group and its corresponding slot in the counterpart group, performing a correlation operation to obtain a correlation value for information in each of these corresponding pairs of slots;

(iv) summing said obtained correlation values to obtain a correlation sum and storing said obtained correlation sum;

(v) obtaining a next correlation sum by:

(a) performing a correlation operation to obtain a correlation value for information in the slot at the first slot of said first group and the corresponding slot in said counterpart group;

(b) performing a correlation operation to obtain a correlation value for information in the slot outside the first group adjacent to the last slot of said group and the corresponding slot outside said last slot of said counterpart group;

(c) reforming said first group and said counterpart group to exclude the respective slots first slots and to include the respective slots adjacent the last slots; and (d) from the correlation sum last obtained, subtracting the correlation value obtained in (a) and adding the correlation value obtained in (b) to obtain a correlation sum;

(vi) storing said correlation sum obtained in (d);

(vii) repeating steps (v) and (vi) until at least a number of correlation sums equal to said known minimum length are obtained and stored;

(viii) examining said stored obtained correlation sums to select the sum with the greatest magnitude, this selected sum indicative of the presence of said sequence and thereby indicating the slot timing.

2. The method of claim 1 wherein said indication of slot timing in step (viii) is employed to identify a region of interest in said received number of slots of said at least one signal for processing by a subsequent acquisition operation.

3. The method of claim 1 wherein the sequence of information indicating the slot timing is known to both the transmitter and receiver and, once said slot timing is determined, the frequency offset in said received is determined from the steps of:

(1) forming a vector comprising determined correlation values between said an instance of said minimum length of said known information as received by said receiver and said known information signal;

(2) repeating step (1) for additional received instances of said minimum length of said known information to obtain a set of vectors;

(3) forming an inner product of said set of vectors to obtain a set of obtained products;

(4) determining an average value of said obtained products and determining the arctangent of the average value;

(5) determining from the nominal frequency of interest and a predetermined maximum error in the receiver the values, if any, which can be added to the determined arctangent;

(6) from $$\Delta f = \frac{B}{2\pi(\text{interval})T},$$

where $B=\tan^{-1}(\text{average value})+2\pi$ (the values determined in step (5)) and interval is the number of slots between the start of instances of the signal, determining the possible frequency offsets $\Delta f$ for each value determined in step (5) and testing each determined value by applying it to said minimum length of said known information as received by said receiver and then correlating the resulting information with said known information signal; and (7) selecting the possible frequency offset with the best correlation value determined in step (6) as the frequency offset.

4. The method of claim 1 wherein the sequence of information indicating the slot timing is known to both the transmitter and receiver and, once said slot timing is determined, the initial phase offset at said receiver is determined from the steps of:

(1) forming a vector V comprising determined correlation values between said instance of said minimum length k of said known information as received by said receiver and said known information signal for $N_{acc}$ instances of said received information;

(2) determining the initial phase φ from $$e^{j\phi} = \sum_{k=1}^{N_{acc}} \frac{\text{sum}(V(k))}{N_{acc} * \sum e^{jkT\Delta f 2\pi}}$$

where T represents the duration of each signal and $\Delta f$ represents the frequency offset.

5. A method of determining frequency offset in a radio receiver from a signal transmitted by a radio transmitter which transmits, in a time-slotted arrangement, at least one signal which includes a sequence of information indicating the slot timing and having a length at least equal to a known minimum length and which sequence is repeated in said at least one signal at a known interval, comprising the steps of:

(a) receiving said signal and determining the slot timing of said signal;

(b) forming a vector comprising determined correlation values between an instance of said minimum length of said known information as received by said receiver and said known information signal;

(c) repeating step (b) for additional received instances of said minimum length of said known information to obtain a set of vectors;

(d) forming an inner product of said set of vectors to obtain a set of obtained products;

(e) determining an average value of said obtained products and determining the arctangent of the average value;

(f) determining from the nominal frequency of interest and a predetermined maximum error in the receiver the values, if any, which can be added to the determined arctangent;

(g) from $$\Delta f = \frac{B}{2\pi(\text{interval})T},$$

where $B=\tan^{-1}(\text{average value})+2\pi$(the values determined in step (f)) and interval is the number of slots between the start of instances of the signal, determining the possible frequency offsets $\Delta f$ for each value determined in step (f) and testing each determined value by applying it to said minimum length of said known information as received by said receiver and then correlating the resulting information with said known information signal; and (h) selecting the possible frequency offset with the best correlation value determined in step (g) as the frequency offset.

* * * * *

UNITED STATES PATENT AND TRADEMARK OFFICE
CERTIFICATE OF CORRECTION

| | | |
|---|---|---|
| PATENT NO. | : 7,103,362 B2 | Page 1 of 1 |
| APPLICATION NO. | : 10/473337 | |
| DATED | : September 5, 2006 | |
| INVENTOR(S) | : Shiquan Wu and Rene Lamontagne | |

It is certified that error appears in the above-identified patent and that said Letters Patent is hereby corrected as shown below:

On the Title page of the patent, at item (75), after "Shiquan Wu, Ottawa (CA)" insert, --Rene Lamontagne, Ottawa (CA)--.

Signed and Sealed this
Fourteenth Day of October, 2014

Michelle K. Lee
*Deputy Director of the United States Patent and Trademark Office*